United States Patent

[11] 3,585,480

[72] Inventor Johnny T. Kirkpatrick
Lowell, Mass.

[21] Appl. No. 776,984
[22] Filed Nov. 19, 1968
[45] Patented June 15, 1971

[73] Assignee Transistor Automation Corporation
Lowell, Mass.

[54] CONTROL SYSTEM FOR WAFER TEST APPARATUS
7 Claims, 9 Drawing Figs.

[52] U.S. Cl. .......... 318/603, 318/569
[51] Int. Cl. .......... G05b 1/06
[50] Field of Search .......... 318/20.320, 20.105; 324/158

[56] References Cited
UNITED STATES PATENTS

| | | | |
|---|---|---|---|
| 2,917,640 | 12/1959 | Batterman et al. | 318/29 (20.105) |
| 2,922,940 | 1/1960 | Mergler | 318/30 X |
| 3,098,187 | 7/1963 | Sciaky | 318/162 |
| 3,414,785 | 12/1968 | Orahood et al. | 318/18 |
| 3,437,929 | 4/1969 | Glenn | 324/158 |

*Primary Examiner*—Benjamin Dobeck
*Attorney*—Morse, Altman & Oates

ABSTRACT: A control system is provided for use in the operation of an XYZ table supporting an integrated circuit wafer for test purposes. The system is adapted to receive inputs from a computer or tape reader to provide automatic point-to-point probing of the wafer. The system may be converted from one form of input to another by substituting interface and diode matrix decoding circuit boards. The system employs a down counter in place of a register as a memory unit and functions by setting into the counter a particular number representing an instruction to index the table a certain distance along an axis. When the counter counts down to zero the system stops.

INVENTOR
JOHNNY T. KIRKPATRICK
BY
Morse, Altman & Oates
ATTORNEYS

INVENTOR
JOHNNY T. KIRKPATRICK
BY
Mors, Altman & Oates
ATTORNEYS

INVENTOR
JOHNNY T. KIRKPATRICK
BY
Mora, Attman & Oates
ATTORNEYS

INVENTOR
JOHNNY T. KIRKPATRICK
BY
Mason, Altman & Oates
ATTORNEYS

*INVENTOR.*
JOHNNY T. KIRKPATRICK
*BY*
Morse, Altman & Oates
ATTORNEYS

CONTROL SYSTEM FOR WAFER TEST APPARATUS

BACKGROUND OF THE INVENTION

1. Field of the Invention

This invention relates generally to automatic control systems and more particularly is directed towards an automatic control system for use with wafer test equipment. More specifically the invention is directed towards a control system for operating an XYZ table having a chuck on which is mounted an integrated circuit wafer adapted to be indexed to various positions for test purposes.

2. Description of the Prior Art

Control systems for automatic wafer test equipment employ motors for driving the wafer along mutually perpendicular axes. Such systems usually involve computers or tapes to provide instructions and include memory registers for storing the data. Heretofore such systems have been extremely complicated, expensive and rather functionally limited. It is an object of the present invention to provide a new and improved control system for operating wafer test equipment and the like wherein the system is of simplified design, capable of more flexible operation, of lower cost and one which does not require a conventional memory system.

SUMMARY OF THE INVENTION

This invention features a control system for use with wafer test equipment and the like comprising interchangeable interface and diode matrix decoding circuits permitting any desired form of binary-coded decimal inputs. The input signals may be derived from a tape reader or computer, for example, and fed to counters which in turn provide driving signals to motors controlling an XY table. The motor movement is determined by the count sent into the counter and the motor will operate until the counter counts down to zero at which point the motors will stop. Means are provided for reciprocating the table which supports the chuck and wafer to and away from a test probe and providing signals for recycling.

DESCRIPTION OF THE PREFERRED EMBODIMENT

General

Figure 1:
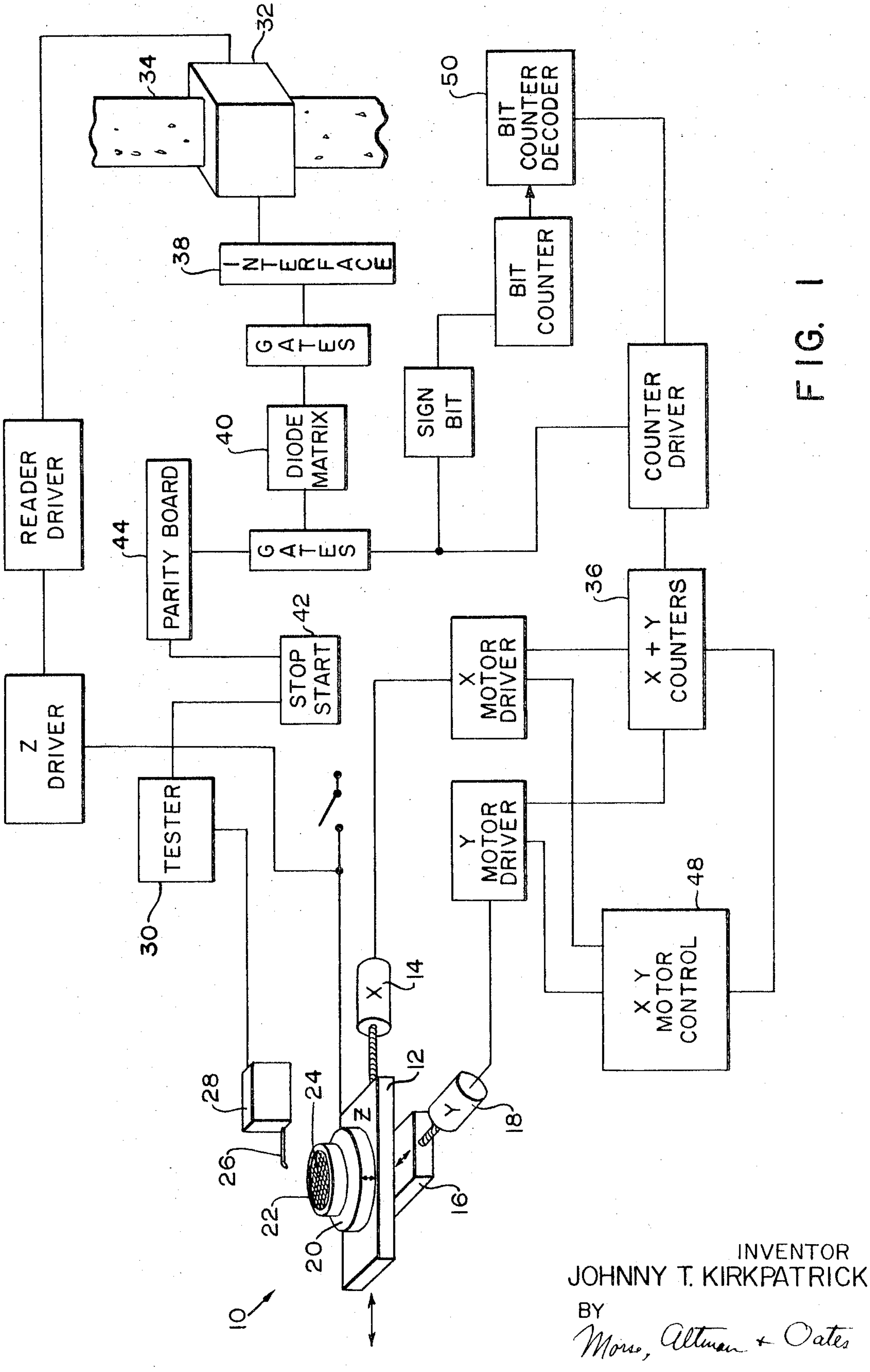
FIG. 1 is a schematic diagram of a control system made according to the invention.

Referring now to FIG. 1 of the drawings, the system is organized about an XYZ table, generally indicated by reference character 10, and comprised of an X table 12 driven by an X motor 14, the table 12 being mounted for movement along an X axis with respect to a Y table 16 driven by a Y motor 18. The X and Y tables are movable along X and Y axes, mutually perpendicular to one another, and carry a Z stage 20 on which is mounted a vacuum chuck 22, or the like, adapted to be reciprocated along a vertical Z axis. The chuck 22 carries a monolithic wafer 24 comprised of a plurality of integrated circuits arranged in grid form and in position opposite a test probe 26 carried by a test head assembly 28 operatively connected to test circuitry, generally indicated in block form at 30.

The system receives coded input signals from a computer or tape reader 32, the tape being indicated by reference character 34. The signals are employed to drive the X and Y motors 14 and 18 for predetermined periods so as to index X and Y tables, together with the wafer 24, with respect to the probe tip 26. In this fashion the wafer, each time it is moved to a predetermined coordinate position, will be reciprocated up against the probe tip to test it. The operation will repeat itself until each circuit on the wafer is tested.

In general, the system provides automatic point-to-point probing of semiconductor wafers from indexing instructions generated by the tape reader or a digital computer, as desired. X and Y index instructions may be provided in BCD (binary-coded decimal) coded form. These instructions are stored in counters, generally indicated in block form 36 in FIG. 1, and used to move the X Y table 10 to the desired coordinate position. When in position the Z stage is actuated to raise the wafer against the probe and a start test signal is delivered to the tester 30. Simultaneously, the instructions for the next indexing operation are loaded in the counter 36. Upon receipt of the end of test signal from the tester the Z stage 20 is lowered and the X Y table moves to the next position. In order to minimize travel time both X and Y motors 14 and 18 may be driven simultaneously.

Coding Instructions

The system may be used with any eight track code format which utilizes four tracks for numerical information and four tracks for BCD coded information. A strobe track is also required. An interface board 38 and a diode matrix decode board 40 are selected to match the desired code format. For purposes of standardization EIA Standard Character Code for Numerical Machine Tool Control, RS–244 may be used.

The system is adapted to function with the following nine symbolic inputs in BCD coded form.

| Input: | Print symbol |
|---|---|
| 1. X | (X) |
| 2. Y | (Y) |
| 3. Sign + | (Sign +) |
| 4. Sign − | (Sign −) |
| 5. End of block | (EOB) |
| 6. Rewind | (R W) |
| 7. Rewind stop | (RWS) |
| 8. Emergency stop | (EMG. Stop) |
| 9. Delete | (Delete) |

Figure 2:
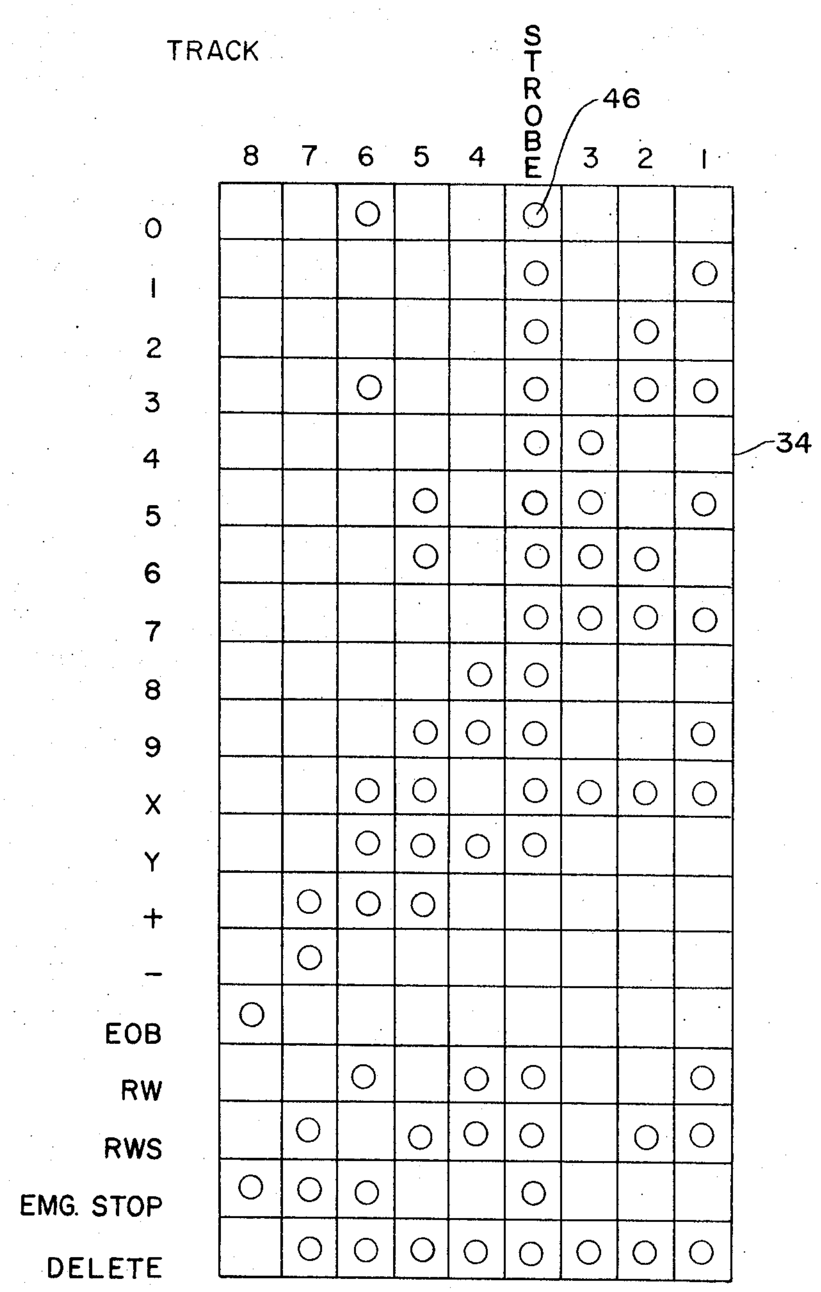
FIG. 2 is a diagram of a portion of a tape track coded for use with the system.

In FIG. 2 there is illustrated in diagrammatic form a section of tape 34 coded in accordance with the RS–244 format. The tape or computer is employed o provide an index command which is the basic instruction employed to move the table 10 from one point to another point along the X or Y axes. An index command consists of the following information coded in the given order:

A.—INDEX COMMAND FOR MOVEMENT ALONG ONE AXIS

| Information | Coded input |
|---|---|
| 1. Index axis | (X or Y). |
| 2. Index direction | (Sign + or sign −). |
| 3. Distance of travel in units | (0 through 9). |
| 4. Distance of travel in tens | (0 through 9). |
| 5. Distance of travel in hundreds | (0 through 9). |
| 6. End of index | (EOB). |

B.—INDEX COMMAND FOR MOVEMENT ALONG TWO AXES

| Information | Coded input |
|---|---|
| 1. First index axis | (X or Y). |
| 2. First index direction | (Sign + or sign −). |
| 3. Distance of travel in units | (0 through 9). |
| 4. Distance of travel in tens | (0 through 9). |
| 5. Distance of travel in hundreds | (0 through 9). |
| 6. Second index axis | (Y or X). |
| 7. Second index direction | (Sign + or sign −). |
| 8. Distance of travel in units | (0 through 9). |
| 9. Distance of travel in tens | (0 through 9). |
| 10. Distance of travel in hundreds | (0 through 9). |
| 11. End of index | (EOB). |

The other symbolic inputs used as follows:

RW used at the end of a program to rewind the tape to the beginning.

RWS—used at the start of program to identify the beginning.

Delete—if a mistake is made while punching the tape the row my be erased by punching out tracks 1 through 7. The machine will ignore entirely a row punched Delete.

EMG. stop—will not normally be used with a tape program. EMG. stop is available for use with a computer monitor if a situation arises that requires a complete shutdown of the machine.

Operating Procedure

The digital computer or tape reader 32 is connected to the system to supply the programmed instructions. The wafer or slice 24 to be probed is placed on the vacuum chuck 22 and the table 10 is positioned using X and Y paddle switches. Positioning is accomplished by aligning the probe 26 with the circuit on the slice which has been selected as the origin point for the programmed probing instructions. After the origin point has been aligned under the probes a mode switch is switched to automatic. The system is then ready to operate. When a start switch 42 is depressed the Z stage 20 rises and start test signal is sent to the tester 30. The index command for the first positioning move is entered from the computer or tape reader 32 and stored. When the testing of the first circuit is completed the tester 30 sends an end of test signal to the system. This signal causes the Z stage 20 to lower and the stored index command is used to move the table 10 to the next circuit to be tested. When in position the Z stage 20 rises and the process is repeated.

CIRCUIT DESCRIPTIONS

Interface board

Figures 3, 4:
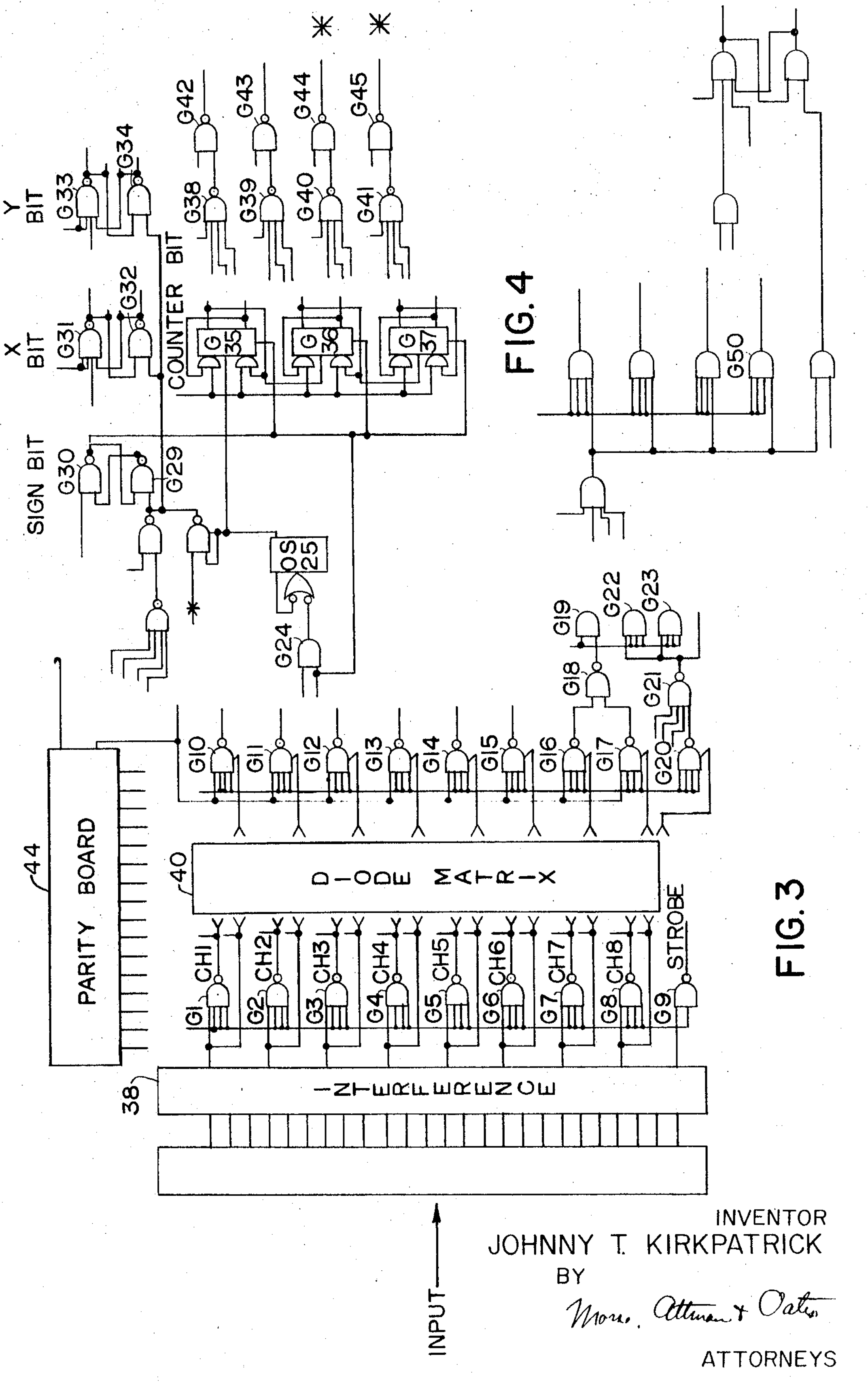
FIG. 3 is a logic diagram showing the input portion of the system.
FIG. 4 is a logic diagram showing the sign bit, X-bit, Y-bit and counter bit portions of the system.

The input from the computer or tape reader 32 to the system is applied to the interface board 38 (FIGS. 1 & 3). Sign levels are not critical and the resistor network of the interface board is designed to match the input signal to the levels required by the system. The switching time of the interface board is on the order of 100 nanoseconds. The system employs positive logic utilizing NAND gates throughout. The presence of a signal (a logical 1) is indicated by +5 volts; in the absence of a signal (a logical O) is indicated by 0 volts.

Each NAND gate operates as follows:

If all inputs =1; the output =0.

If any inputs =0; the output =1.

Single to Double Rail

In order to decode the BCD input, both the signal and the inverse of the signal on each track of the tape 34 are needed. Gates G1 through G8 are used as inverters to provide the diode matrix 40 with signals CH1 through CH8. The direct connections from the interface board through the diode matrix provide the $\overline{\text{CH1}}$ through $\overline{\text{CH8}}$ signals.

For example, a row on the tape 34 with a single hole in track 1 will cause the tape reader 32 to switch its track 1 output from some positive level to ground. This ground is passed through the interface board 38 to gate G1. The zero on input 01 gate G1 causes a 1 output (+5 volts). Thus a hole in channel 1 causes a 1 to appear at the line designated CH1, and a 0 to appear at the line designated $\overline{\text{CH1}}$.

As each row is read from the tape, 16 signals, consisting of CH1, $\overline{\text{CH1}}$ through CH8, and $\overline{\text{CH8}}$, are presented to the diode matrix 40 for decoding. In addition, a 1 on the strobe line is generated each time the reader 32 reads the strobe hole which is present on each row of the tape. Thus a strobe signal is generated by gate G9 each time the tape reader stops.

Diode Matrix

The diode matrix decode board 40 is supplied to match the desired BCD code. Any eight track BCD code may be used for indicating the symbolic inputs, and any four of the eight tracks may be designated to carry the numerical input.

The eight track inputs plus the eight inverse inputs are applied to the diode matrix board 40. An input corresponding to one of the nine permissible symbolic inputs results in an output from the diode matrix board 40 to the correct decode driver, gates G10 through G20.

Parity Board

The system is designed to operate on Odd parity. A parity board 44 (FIGS. 1 & 3) monitors each row of information from a tape reader 32 or computer and checks for odd parity.

Figure 8:
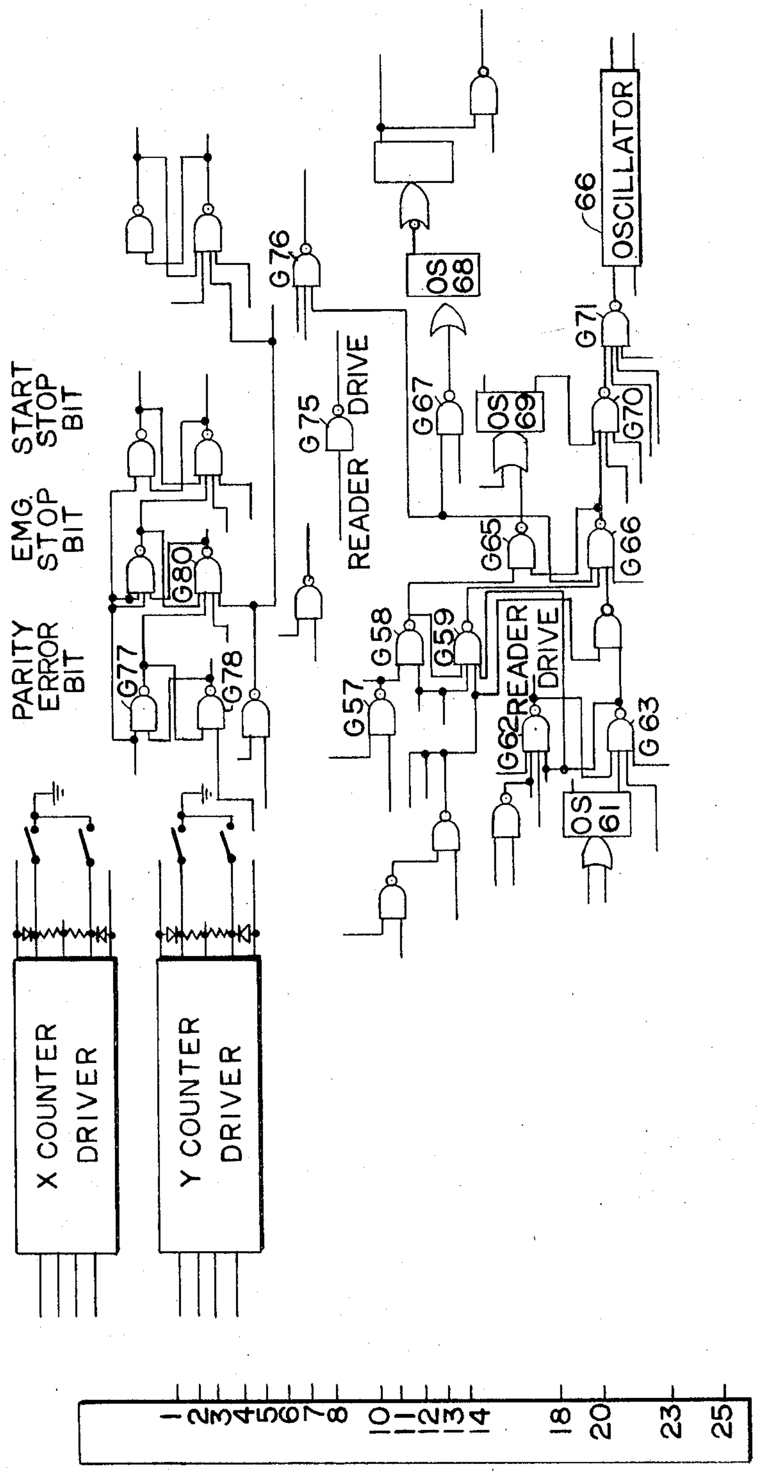
FIG. 8 is a logic diagram showing further portions of the logic system including the X and Y motor drivers, and, FIG. 9 is a timing diagram.

When the parity is correct, the output of the parity board 44 is a 1 on the Odd parity line to gate G78 (FIG. 8). When the parity is not correct, the output on the parity board 44 is a O on the Odd parity line. This switches the output on the parity error bit gates G77 and G78 (FIG. 8) to 0 which switches the output of gate G80 to O, causing an emergency stop.

Enable Circuit

Each row on the tape 34 preferably contains a strobe hole 46 and, when the strobe is read, the gate G9 generates a 1 on a strobe line 48.

Figures 5, 6, 7:
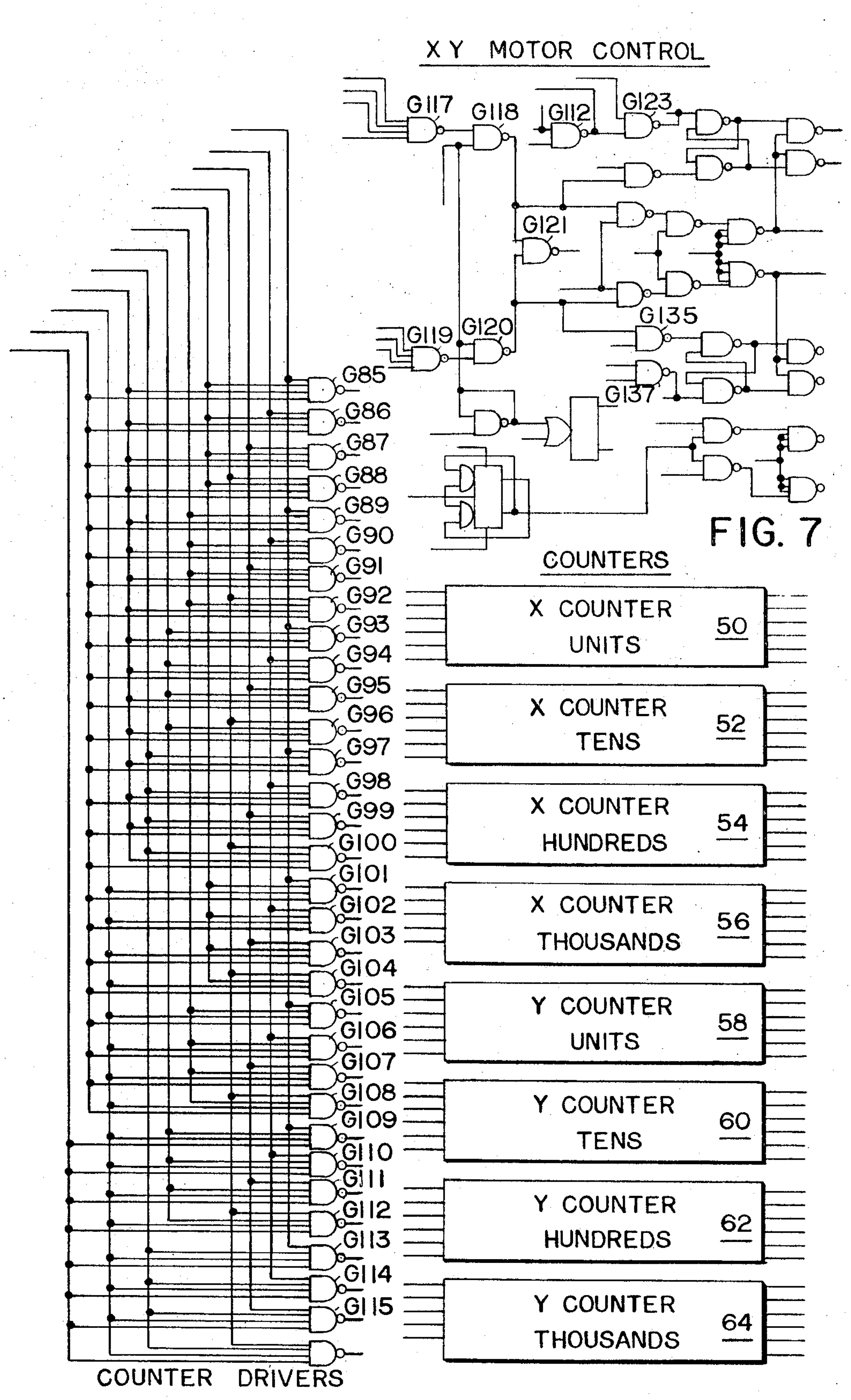
FIG. 5 is a logic diagram of the counter drivers.
FIG 6 is a logic diagram of the X and Y counters.
FIG. 7 is a logic diagram of the X Y motor control.

As long as $\overline{\text{EMG STOP}}$ and $\overline{\text{RW}}$ are both 1 and DELETE as a O, the 1 on the strobe line 48 causes the output of gate G21, the $\overline{\text{ENABLE}}$ line, to go to O. The $\overline{\text{ENABLE}}$ signal is sent to gate G24 and also to gates G22 and G23, causing them to generate an ENABLE signal. Two gates are used for fan out purposes. The ENABLE signal is sent to all the decode drivers, gates G10 through G17; all the counter drivers, gates G85 through G116 (FIG. 5); and to the parity board 44 each time the tape reader 32 or computer reads a new row of information.

X-Bit and Y-Bit

When an index command is sent to the system, the first row of information identifies the index axis. If the index axis is designated as X, the X decode driver, gate G14 (FIG. 3) sends a O along the X line to gate G31 (FIG. 4) in the X-bit. The output of gate G31 switches from 0 to 1, causing gate G32 to switch from 1 to O. The zero from gate G32 locks gate G31 until a reset signal is received when the index command is fully loaded. The 1 output of gate G31 is sent to all the X counter drivers, gates G85 through G100 (FIG. 5), and to gate G123 (FIG. 7) in the X motor control, generally indicated by block 48 in FIG. 1.

If the index axis is Y, the Y decode driver, gate G15, sends a O along the $\overline{\text{Y}}$ line to gate G33 (FIG. 4) in the Y-bit. The 1 output of gate G33 causes gate G34 to switch and lock gate G33 until the reset signal is received. The 1 output of gate G33 is sent to all the Y counter drivers, gates G101 through G116 (FIG. 5), and to gate G135 (FIG. 7) in the Y motor control.

Sign Bit

The second row of information in the index command contains the sign information. If a SIGN + is read, the SIGN + decode driver, gate G16 (FIG. 3), puts a 0 on the $\overline{\text{SIGN}+}$ line which switches the output of gate G18 from 0 to 1, and switches the output of gate G122, FIG. 7) in the motor control circuit, from 0 to 1. If the sign information is SIGN −, the SIGN − decode driver, gate G17 (FIG. 3) puts a 0 on the $\overline{\text{SIGN}-}$ line which switches gate G18 only.

For either sign the output of gate G18 drives gate G19 and puts a 0 on the $\overline{(\text{SIGN}+.\ \text{SIGN}-)}$ line to gate G30 (FIG. 4) in the sign bit circuit. The output of gate G30 switches from 0 to 1 which drives gate G29. Gate G29 switches from 1 to 0 and locks gate G30 until the reset signal is received. The 1 output of gate G30 also releases the bit counters, G35, G36 and G37 (FIG. 4) and puts a 1 on the bottom input to gate G24. Up to this point the $\overline{\text{ENABLE}}$ line to the top input of gate G24 has been switching from 1 to 0 for the duration of each strobe hole but has had no effect on the output of gate G24. Since the bottom input of G24 was a 0, its output remained at 1.

Now with the bottom input at 1, the output of gate G24 will switch from 0 to 1, for the duration of each strobe hole when the ENABLE goes from 1 to 0.Since the strobe hole of the sign information now is still present, the output of gate G24 switches to 1 at this point.

A one-shot OS25 triggers on the negative going edge of a pulse from gate G24. This occurs at the end of the strobe hole when the $\overline{\text{ENABLE}}$ line switches back from 0 to 1, switching the gate G24 output from 1 to 0. Thus when the strobe hole and the sign information row ends, the one-shot OS25 is triggered. The output of OS25 is a pulse which goes from 0 to 1 for a period of 100 nanoseconds. This pulse causes the bit counter G35 to flip from its reset position to its set position.

Bit Counters

The bit counters G35, G36 and G37 are J-K flip-flops, They are connected in series to form a binary counter. The six outputs are connected to the bit counter decoders, indicated in blocks 50 and 51 of FIG. 1, so that the decoder gates will be enabled one at a time. The six outputs are designated 1, $\overline{\mathbf{1}}$, 2, $\overline{\mathbf{2}}$, 4 and $\overline{\mathbf{4}}$. In the reset condition there are 0's on the 1, 2 and 4 lines and 1's on the $\overline{\mathbf{1}}$ $\overline{\mathbf{2}}$ and $\overline{\mathbf{4}}$ lines.

Figure 9:
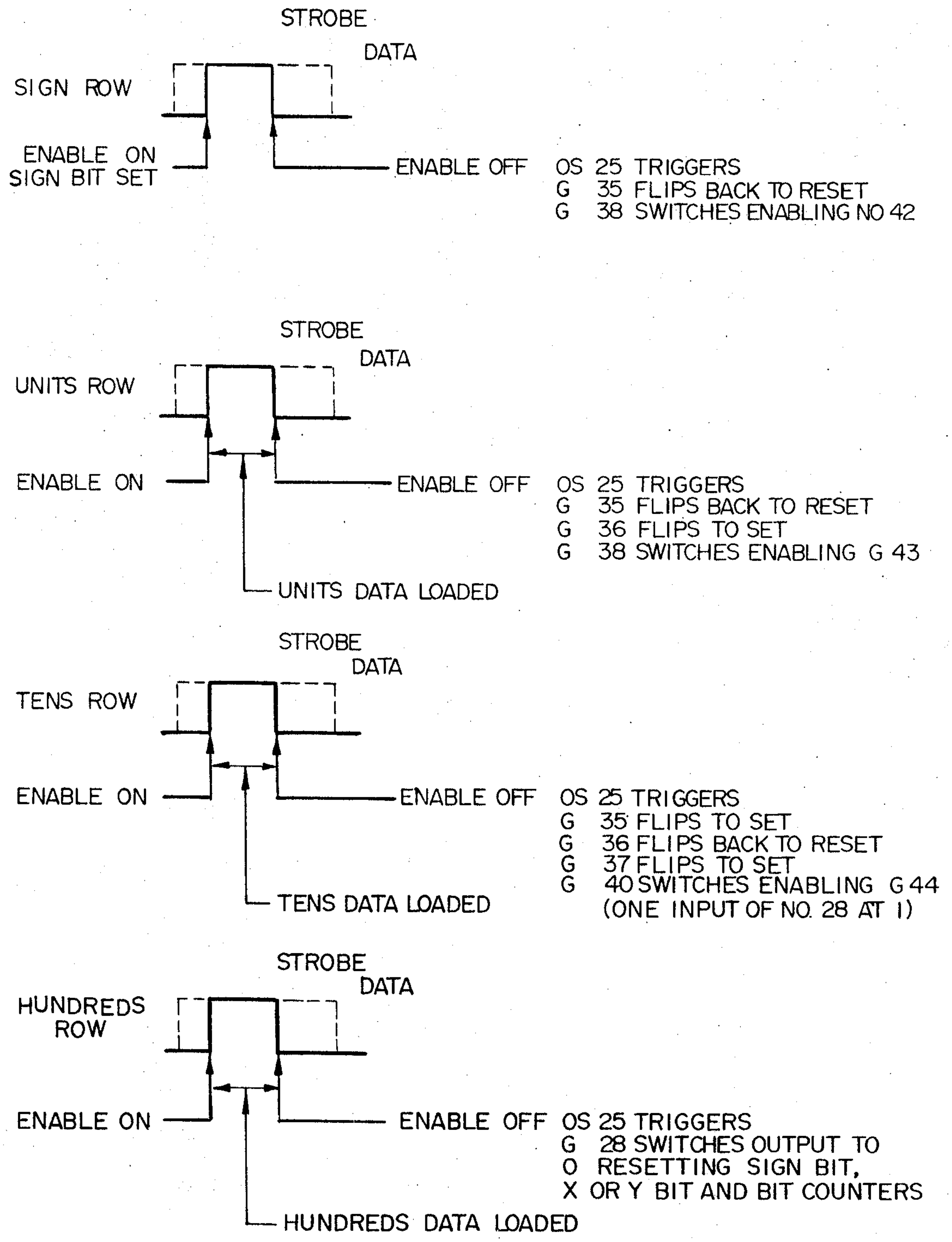

As shown in the timing diagram of FIG. 9, the trailing edge of the strobe hole in the sign row on the tape triggers the one-shot OS25 which initials the first count pulse. The bit counter G35 flips to its set condition putting a 1 on the 1 line to the bit decoders.

Bit Counter Decoders

The bit counter decoders comprise gates G38 through G45 (FIG. 4) and of these gates G38 through G41 are connected to the bit counters so that only one gate at a time will have all its inputs at 1. When the bit counter G35 flips to its set condition, the only gate with all inputs at 1 is gate G38. The output of gate G38 switches from 1 to 0 which, in turn, switches gate G42, the units enable, from 0 to 1.

Counter Drivers

Each counter 50, 52, 54, 56, 58, 60 and 64 (FIG. 6) has four counter drivers G85 through G116 (FIG. 5) through which the numerical input of the tape 34 is gated. At this point, the X units counter drivers gates G85, G86, G87 and G88, are the only counter drivers which are fully enabled except for the enable line.

The third row of information in the index command contains the units travel data. As shown in the timing diagram of FIG. 9, the strobe hole in units row initiates an enable signal. This fully enables the X units counter drivers and the data is loaded into the X units counter 50. At the trailing edge of the strobe hole, the enable signal stops and the one-shot OS25 (FIG. 4) triggers. This flips bit counter G35 back to reset and G36 to set. Gate G39 now has all inputs at 1. It switches from 1 to 0 causing gate G43, the tens enable to switch from 0 to 1. Now the X tens counter drivers, gates G89, G90, G91 and G92, are the only counter drivers which are fully enabled except for the enable line.

The fourth row of information contains the tens travel data. The strobe hole in the tens row initials an enable signal and the tens information is loaded. At the trailing edge of the strobe hole, enable stops and OS25 triggers. Bit counters G35 flips to set, G36 flips to reset and G37 flips to set. Gate G40, which has all inputs at 1, drives gate G44, the hundreds enable gate. Gate G44 completes the X hundreds counter drivers except for the enable signal. Gate G44 also put a 1 on the top input of gate G28.

The fifth row of information contains the hundreds travel data. This strobe hole initiates an enable signal and the hundreds information is loaded into the X hundreds counter 54. The trailing edge of the strobe hole, enable stops and OS25 triggers. This time gate G28 has a 1 on top input so that the 1 from OS25 to the bottom input causes G28 to switch its output to 0. This 0 is applied to gate G29 in the sign bit, gate G32 in the X bit, and gate G34 in the Y bit, causing them all to switch to their reset condition. The resetting of gate G30 in the sign bit generates a 0 to all the bit counters G35, G36 and G37, which switches them to the reset condition.

Optionally, thousands counters 56 and 64 may be provided in the system to furnish additional digits for designating index travel. Where the thousands counters 56 and 64 are employed, a sixth row of information is added to the index command to designate thousands travel data. In this case gate G44 is not connected to gate G28. Instead the trailing edge of the strobe hole in the hundreds row triggers G25 which flips G35 to reset, G36 to set and G37 to reset. This switches gate G41 which switches gate G45, the thousands enable. Gate G45 is connected to gate G28 when the optional thousands counters are used. The strobe hole in the thousands row on the tape initiates an enable signal which loads the thousands data through the thousands counter drivers. The trailing edge of the strobe hole triggers OS25 and G28 switches resetting the sign bit, X-bit, Y-bit and the bit counters as before.

The circuitry is now completely reset and ready to receive either an end of block signal or an identification of a second axis signal. (In this example, X travel was indicated first so the acceptable signals would be either EOB or Y). If travel is along only one axis an EOB signal follows the hundreds (or thousands) information. Upon receiving the FOB signal, the decode driver G10 puts a 0 on the EOB line to one shot OS61 (FIG. 8). The output of OS61 to G63 is normally 1 and switches to 0 when triggered by the EOB signal.

The output of G62, reader drive, is 1 when reading the tape and $\overline{\text{EMG. STOP}}$ is normally 1. Thus, the 0 input from OS61 causes the output of G63, $\overline{\text{READER DRIVE}}$ to switch from 0 to 1.

The inputs to gate G62 are normally 1 except for the 0 from G63. When this 0 switches to 1, following the EOB signal, gate G62 switches to 0. This 0 on the reader drive line to gate G75 causes G75 to stop the reader 32. If travel is along both axes, a second axis identification signal is used instead of EOB. This signal sets the X or Y bit and the index command is loaded as before. After loading the second axis information, an EOB signal must be used to stop the reader.

While the index command is being loaded the tester 30 is performing the test on the first circuit of the wafer 24. When the test is completed the tester 30 sends an end of test signal to the system. A positive going pulse is required, typically a minimum of +5 volts and 2 ms. duration. The EOB signal is connected to gate G50 which causes it to switch from 1 to 0. This 0 switches gate G56 from 0 to 1. As all the other inputs to gate G50 are 1, this 1 causes G59 to switch from 1 to 0. All the inputs to gate G66 are 1 so this 0 causes G66 to switch from 0 to 1.

This 1 to gate G65 causes it to switch from 1 to 0 since the other input from G58 is a 1. The 1 from G65 goes to gate G76. The other inputs to G76 are both 1 so the 1 from G65 causes G76 to switch from 0 to 1. This 1 on the lower Z stage line drives the Z stage solenoid and the Z stage 20 is lowered. The 1 from G65 also goes to gate G67, switch G67 from 0 to 1. This charges a capacitor in one-shot OS 68 so that OS 68 will have a 100 ms. delay when 1 from G67 is switched back to 0. The 1 from G65 also goes to one-shot OS 69. OS 69 switches from 1 to 0 for 50 ms. which inhibits gate G70 during the period when the Z-stage is being lowered. At the end of 50 MS the output of OS 69 returns to 1 so that all inputs of G70 are 1. G70 switches from 1 to 0. All other inputs to G71 are 1 so that G71 switches from 0 to 1 and starts oscillator 66.

X and Y Motor Control Circuit

The purpose of the motor control circuit is to shape the pulses from the oscillator 66 and direct them to the motors 14 and 18 to produce the correct table travel.

The inputs to gate G117 (FIG 7) are connected to the three (or Four) X counters 50, 52, 54 and 56. The output from each counter is a 0 when the counter contains any index data. As the counter counts down to 0 index data, the output from the counter gate G117 goes to 1. As long as any X counter contains any X index data gate G17 will have a 1 output since at least 1 input will be 0. When all the X counters have counted down to 0, the output of G117 will switch to 0. The Y counters are connected to gate G119 in the same fashion.

When data is loaded in the X counters, the output of 117 is 1 so that the output of G118 is 0. This 0 (along with the 0 from G120 if the Y counters contain data) keeps the output of G121 at 1. This 1 applied to gate G57 (FIG. 8) on the $\overline{\text{RAISE Z-STAGE}}$ line keeps the Z-STAGE lowered. The 1 applied to gate G70 (FIG. 8) allows the oscillator 66 to run. The 1 applied to the gated oscillator allows it to run. When the data is counted in both the X AND Y counters and the outputs of both G118 and G120 go to I, the output of G121 switches to 0. This raises the Z-stage, stops the oscillator 66 and stops the gated oscillator at the end of the index.

Gate G122 is used to invert the $\overline{\text{SIGN}}$ + signal from decode driver G16 (FIG. 3) and provides a $\overline{\text{SIGN}}$ + output to gate G123 and G137.

Gates G123 through G128 form a circuit which detects the X and SIGN information and directs the gated oscillator pulses to the correct X motor drivers.

Gates G135 through G140 form a similar circuit to detect Y and SIGN information and direct the gated oscillator pulses to the correct Y motor drivers.

An index command for travel along the X axis will contain X, SIGN and numerical data. Since data is loaded in the X counters, gate G117 will have a 1 output and gate G118 a 0 output. $\overline{X}$ is 0, so both inputs to G124 are 0 and the output is 1. X is 1 and the SIGN + input to G123 is 1 if SIGN + is read or 0 if SIGN − is read. Thus, the output of G123 is 0 if SIGN + or 1 if SIGN −. Gate G123 is used to drive the flip-flop made up of gates G125 and G126 which retains the sign information until the index travel is completed.

The normal condition of the G125 and G126 flip-flop has a 0 output from gate G125 and 1 output from gate G126. Thus, in the reset condition the flip-flop is indicating SIGN −. When X and SIGN + are read the output of G123 is 0, and driving the flip-flop to the set condition (gate G125 output = 1, G125 output = 0) enabling G127 to the X SIGN + motor driver. The G125, G126 flip-flop retains this setting while the X SIGN + signal returns to 0 and the EOB or other axis signal. The setting is retained until the axis index travel takes place and the X counter has counted down switching G117 to 0. Then G118 switches to 1 causing G124 to switch to 0 and reset the G125, G126, G126 flip-flop.

When X and SIGN − are read the output of G123 is 1 and the G125, G126 flip-flop remains in the reset condition (G125 output = 0, G126 output = 1) enabling gate G128 to the X SIGN − motor driver.

Gates G135 through G140 operate in the same fashion to enable G139 when Y and SIGN − are read or G140 when Y and SIGN + are read.

The oscillator 66 is started when the EOT signal is received. Gated oscillator pulses are applied to one input of G131 and G132. If X data is present in the X counters, G118 has a 0 output to G129. The $\overline{\text{LOAD}}$ 1 unless the LOAD switch on the panel is thrown, so the output of G129 is 1 to G131. This means that G131 will pass the gated oscillator pulses through to G133 and from there to G127 and G128. Only one of these, either G127 or G128 will pass the pulses through to the motor driver depending on how the G125, G126 flip-flop has been set by the sign information.

The gated oscillator pulses drive the motors until the X counters are counted down to 0. Then G118 switches to 1 and the output of G129 switches to 0, stopping the flow of drive pulses through G131 and halting the table at the sign position on the X axis.

The Y circuitry works in a similar fashion. Y data present in the Y counters causes a 0 output from G120 which makes the output of G130 go to 1. This 1 to G132 allows the gated oscillator pulses to flow through G134 to G139 and G140, one of which has been enabled by the setting of the Y sign flip-flop G136, 138. When the Y counters have counted down to 0, G120 switches to 1 and the output of G130 switches to 0, stopping the flow of drive pulses through G132 and halting the table at the desired position on the Y axis.

When both X and Y counters have counted down, the outputs of both G118 and G120 go to 1 and G121 switches to 0. The 0 switches G57 to 1 which switches G58 to 0 which, in turn, switches G65 to 1. This 1 from G65 switches G66 to 0, switching G70 to 1, switching G71 to 0 and stopping the oscillator. At the same time, the 1 from G65 switches G76 to 0 and raises the Z-stage. The 1 from G65 also switches G67 to 0, triggering OS68 which initiates a 100 MS delay. This delay allows the Z-stage time to rise. Following the delay, OS68 switches G72 which initiates a START TEST signal to the tester 30. G72 also switches G37 which starts the tape reader drive 32 causing the reader to begin reading the next index command.

Having thus described the invention what I claim and desire to obtain by Letters Patent of the United States is:

1. A system for moving a member selectively along at least three different paths in response to coded instructions, said system comprising:
   a. a first motor adapted to move said member along a first path;
   b. a second motor adapted to move said member along a second path;
   c. reversible counter means operatively connected to said system;
   d. first circuit means for delivering said coded instructions in pulse form to said counter means, said counter means being adapted to accumulate a count of said pulse;
   e. oscillator means electrically communicating with said first and second motor and counter means for generating a sequence of pulses, said first and second motor means moving said member in response to said oscillator means pulses, said counter means counting to zero in response to said oscillator means pulses, each one of said oscillator means pulses decreasing said accumulated count by one, said first and second motors stopping when said counter means is at zero count;
   f. reciprocating means for moving said member along a third path mutually perpendicular to said first and second paths; and
   g. second circuit means operable upon termination of movement of said member along said first and second paths for actuating said reciprocating means.

2. A system according to claim 1 including interchangeable decode circuit means for accommodating said system to different coded instructions.

3. A system according to claim 1 in combination with testing means for testing said member upon termination of movement thereof.

4. A system for testing integrated circuit wafers and the like, comprising:
   a. a support for said wafer,
   b. a probe tip disposed in spaced relation to said wafer,
   c. means for causing relative movement in a given direction between said tip and support for making contact between said tip and said wafer,
   d. a table carrying said support,
   e. said table being movable along two mutually perpendicular paths said paths being perpendicular to said direction,
   f. a pair of pulse responsive motors drivingly connected to said table for indexing said table, said support and said wafer selectively along said paths,
   g. a source of coded instructions for said system, h. reversible counter means operatively connected to said source and to both of said motors, i. first circuit means for delivering instructions from said source in pulse form to said counter, j. said counter being adapted to accumulate a count of said pulses, upon reversal to deliver pulses corresponding to said count to said motors to index both of said motors according to said instructions, and, k. oscillator means electrically communicating with said motors and counter means for generating a sequence of pulses, said motor means indexing said table in response to said oscillator means pulses, said counter means counting to zero in response to said oscillator means pulses, each one of said oscillator means pulses decreasing said accumulated count by one, said motor means stopping when said counter means is at zero, and l. Actuating means responsive to termination of movement of said table for causing said relative movement between said tip and said support.

5. A system according to claim 4 including interchangeable decode circuit means between said source and said counter for accommodating said system to different coded instructions.

6. A system according to claim 4 wherein said source is a computer.

7. A system according to claim 4 wherein said source is a combination coded tape and tape reader.